(12) United States Patent
Valeriano et al.

(10) Patent No.: US 8,910,142 B2
(45) Date of Patent: Dec. 9, 2014

(54) METHOD AND SYSTEM TO REGULATE THE ELECTRONIC AVAILABILITY OF APPLICATION SOFTWARE UPDATES BASED ON INFORMATION COLLECTED REGARDING INSTALLATION, USAGE AND SUPPORT FOR THESE UPDATES

(75) Inventors: Francisco M. Valeriano, Torrance, CA (US); James Murphy, Moreno Valley, CA (US)

(73) Assignee: Xerox Corporation, Norwalk, CT (US)

( * ) Notice: Subject to any disclaimer, the term of this patent is extended or adjusted under 35 U.S.C. 154(b) by 623 days.

(21) Appl. No.: 13/085,729

(22) Filed: Apr. 13, 2011

(65) Prior Publication Data

US 2012/0266155 A1 Oct. 18, 2012

(51) Int. Cl.
*G06F 9/44* (2006.01)
*G06F 9/445* (2006.01)

(52) U.S. Cl.
CPC .................................. *G06F 8/65* (2013.01)
USPC .......................................................... 717/172

(58) Field of Classification Search
None
See application file for complete search history.

(56) References Cited

U.S. PATENT DOCUMENTS

| | | | |
|---|---|---|---|
| 6,151,708 A | 11/2000 | Pedrizetti et al. | |
| 6,401,239 B1 * | 6/2002 | Miron | 717/173 |
| 7,334,005 B2 * | 2/2008 | Sobel | 1/1 |
| 7,461,374 B1 | 12/2008 | Balint et al. | |
| 7,478,381 B2 | 1/2009 | Roberts et al. | |
| 7,555,551 B1 * | 6/2009 | McCorkendale et al. | 709/225 |
| 7,853,609 B2 | 12/2010 | Dehghan et al. | |
| 7,979,515 B2 * | 7/2011 | Morikawa | 709/220 |
| 8,201,164 B2 * | 6/2012 | Reus et al. | 717/177 |
| 8,209,676 B2 * | 6/2012 | Kapadekar et al. | 717/171 |
| 8,255,902 B1 * | 8/2012 | Satish | 717/174 |
| 8,490,084 B1 * | 7/2013 | Alford et al. | 717/177 |
| 8,522,341 B2 * | 8/2013 | Nochta et al. | 726/20 |
| 8,533,708 B2 * | 9/2013 | Kamada et al. | 717/178 |
| 2004/0031030 A1 * | 2/2004 | Kidder et al. | 717/172 |
| 2004/0098715 A1 * | 5/2004 | Aghera et al. | 717/173 |
| 2005/0120040 A1 * | 6/2005 | Williams et al. | 707/102 |
| 2007/0294362 A1 * | 12/2007 | Patel | 709/217 |
| 2009/0024991 A1 * | 1/2009 | Campbell et al. | 717/173 |
| 2009/0150878 A1 * | 6/2009 | Pathak et al. | 717/172 |
| 2010/0058313 A1 * | 3/2010 | Hansmann et al. | 717/168 |

* cited by examiner

*Primary Examiner* — Don Wong
*Assistant Examiner* — Daxin Wu
(74) *Attorney, Agent, or Firm* — Luis M. Ortiz; Kermit D. Lopez; Ortiz & Lopez, PLLC

(57) ABSTRACT

A method for providing software updates. The method comprises selecting an eligible population for a software update from a target population and distributing the software update to the initial eligible population. Thereafter, use and error information is gathered and the size of the eligible population is adjusted according to a stability calculation based on the gathered information. This process is repeated until the entire target population for the update has received the update.

20 Claims, 4 Drawing Sheets

METHOD AND SYSTEM TO REGULATE THE ELECTRONIC AVAILABILITY OF APPLICATION SOFTWARE UPDATES BASED ON INFORMATION COLLECTED REGARDING INSTALLATION, USAGE AND SUPPORT FOR THESE UPDATES

TECHNICAL FIELD

Embodiments are generally related to the field of computer applications. Embodiments are also related to methods and systems for providing more efficient computer updates. Embodiments are additionally related to an electronic distribution method and system for providing software updates.

BACKGROUND OF THE INVENTION

Computer use has become an indispensable part of business and personal life. As the use of computers becomes more prevalent, so to has the need to provide reliable updates to the software associated with computer's operation, In general, updates for computer software are provided using a number of distribution channels. One increasingly common channel for these distributions is the Internet. For example, when a new or updated version of an application becomes available, it can be provided to an end user quickly via an Internet application that allows the end user to download the material. An end user application connects to a central server to determine if updates for the application are available. The end user of the application can trigger this by selecting a "Check for Updates" option. Alternatively, the application may be configured to automatically check for updates according to a preselected frequency.

However, it is common for a large number of machines that require the same download to apply the same update in a short period of time. A very large number of support requests are common when a new update is provided. This may be the result of normal operation activities such as information regarding how to use the updated application, or as a result of unexpected operation activities, like an updated feature causing malfunctions in a given operating environment. Thus, updates that are electronically distributed have the potential to create an unmanageable spike in support requests that can overwhelm support infrastructure, particularly when the spike is related to unexpected operation activities.

Several approaches have been proposed to prevent end user disruption associated with this problem. Typically these solutions are based on the preference settings provided to the user for when the software update is downloaded and/or installed. For example, different users will inevitably select different times and intervals to check for updates. Additionally, the preferences may differ according to load of the system or simply according to user confirmation.

Ultimately, these methods provide little benefit in reducing the load on support infrastructure because the most common update settings will still result in a support request spike. For example, even though an update may be distributed across several hours of the day based on system load and/or user preferences, at the end of the day a large portion of the systems in the field will be updated, resulting in an unmanageable support request increase.

Further, existing methods do not adequately account for the support spike associated with a particular update. Specifically, existing methods to not allow for corrective measures to be implemented before the update has been released to a significant percentage of the eligible population of end users. Therefore, a need exists for an improved method and system for regulating and distributing software updates, according to the installation, usage, and support feedback.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide for a method and system for computer updates.

It is another aspect of the disclosed embodiments to provide for an enhanced method and system for providing computer updates.

It is yet another aspect of the disclosed embodiments to provide an enhanced method and system for electronically delivering computer updates according to installation, usage, and support feedback.

The aforementioned aspects and other objectives and advantages can now be achieved as described herein. A method for providing software updates. The method comprises selecting an eligible population for a software update from a target population and distributing the software update to the initial eligible population via an Internet and/or network connection or via a removable storage media.

Thereafter, use information and error information is gathered from Application Instances associated with running the software update by a remote diagnostics module 325. Additional information may also come from information collected by a customer support organization.

The size of the eligible population is adjusted on a set time interval, according to a stability calculation provided by a distribution engine. The stability calculation is based on the use information and error information. The adjustment to the eligible population is adjusted until the entire target population has received the update. However, the size of the eligible population may increase or decrease according to the stability calculation of the update.

The method further includes considering a number of factors including: the number of Application Instances that have successfully and unsuccessfully installed the software update, the number of Application Instances that have successfully and unsuccessfully implemented the software update, the number of said Application Instances that have either encountered an error or not encountered an error when using the software update, and the number of Application Instances that have used the software update for a stable time interval. If the stability calculation reaches a predefined threshold, a release manager suspends further distribution of the software update until the update can be fixed or replaced by a new update.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
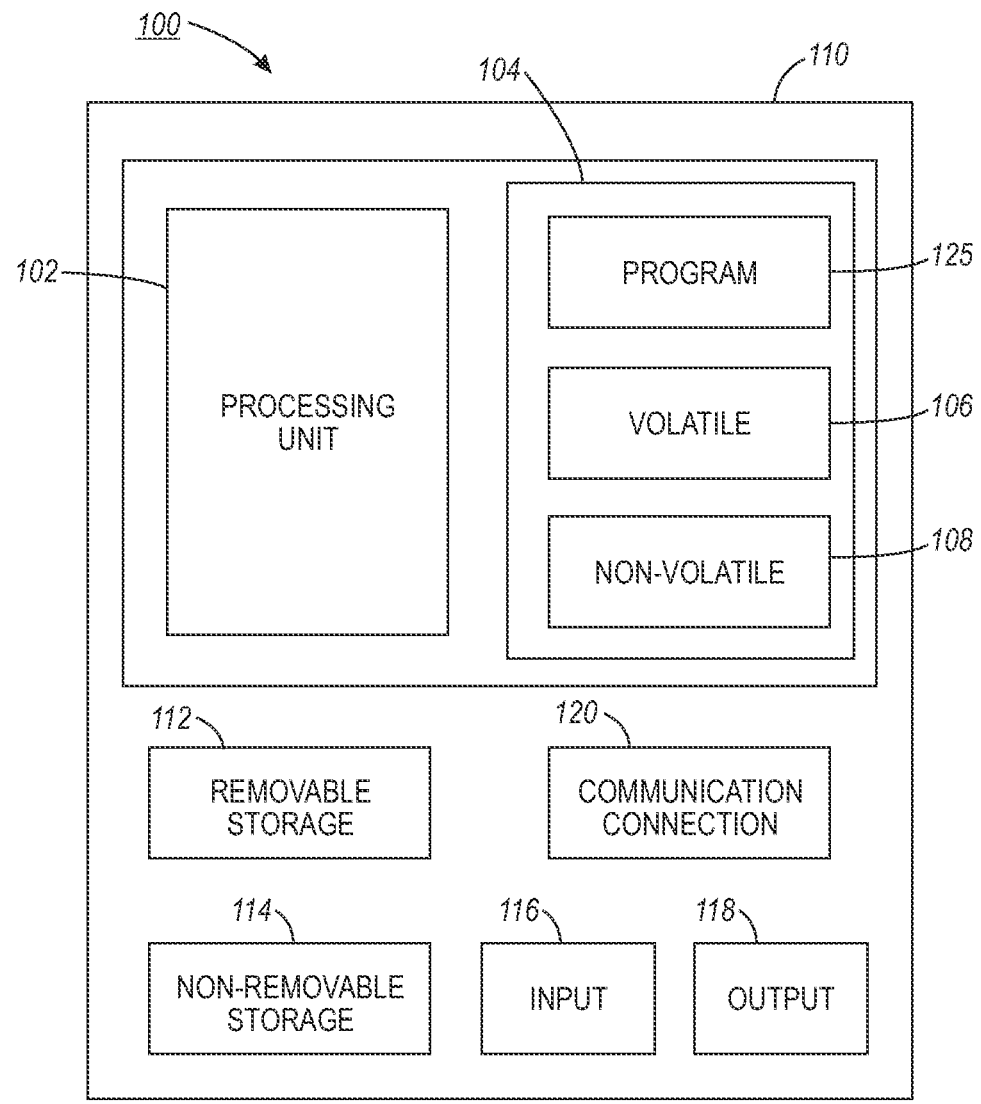
FIG. 1 depicts a block diagram of a computer system which is implemented in accordance with the disclosed embodiments.

A block diagram of a computer system 100 that executes programming for executing the methods and systems disclosed herein is shown in FIG. 1. A general computing device in the form of a computer 110 may include a processing unit 102, memory 104, removable storage 112, and non-removable storage 114. Memory 104 may include volatile memory 106 and non-volatile memory 108. Computer 110 may include or have access to a computing environment that includes a variety of computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions, as well as data, including video frames.

Computer 110 may include or have access to a computing environment that includes input 116, output 118, and a communication connection 120. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks. This functionality is described in more detail in FIG. 2.

Output 118 is most commonly provided as a computer monitor but may include any computer output device. Output 118 allows a user to navigate through the virtual environment embodied by computer system 100. In addition, input 116, which commonly includes a computer keyboard and/or pointing device such as a computer mouse, allows a user to select and instruct computer system 100. A user interface can be provided using output 118 and input 116.

Computer-readable instructions, for example, program module 125, are stored on a computer-readable medium and are executable by the processing unit 102 of computer 110. Program module 125 may include an application. A hard drive, CD-ROM, RAM, flash memory, and a USB drive are just some examples of articles included in a computer-readable medium.

Figure 2:
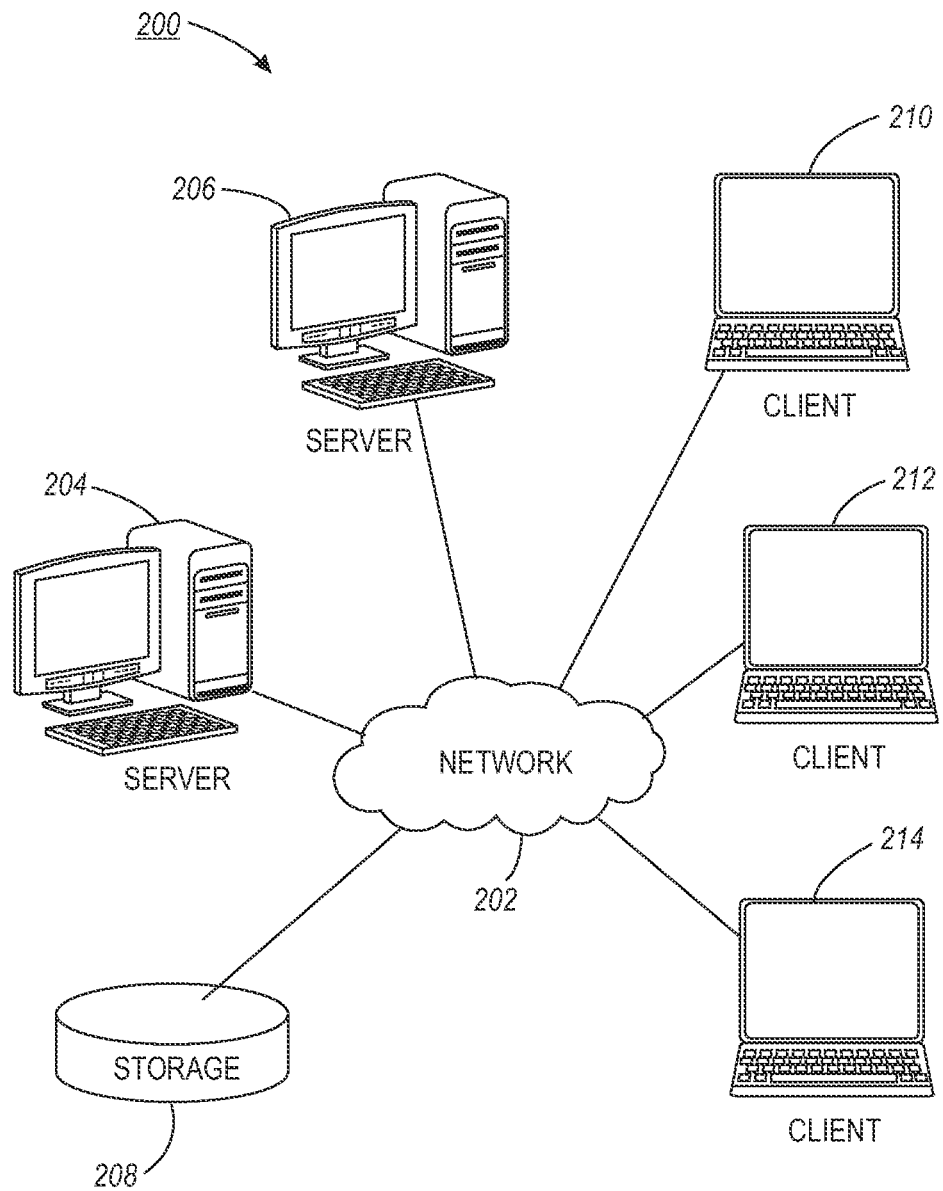
FIG. 2 depicts a graphical representation of a network of data-processing devices in which aspects of the present invention may be implemented.

FIG. 2 depicts a graphical representation of a network of data-processing systems 200 in which aspects of the present invention may be implemented. Network data-processing system 200 is a network of computers in which embodiments may be implemented. Note that the system 200 can be implemented in the context of a software module such as program module 125. The system 200 includes a network 202 in communication with one or more clients 210, 212, and 214. Network 202 is a medium that can be used to provide communications links between various devices and computers connected together within a networked data processing system such as computer system 100. Network 202 may include connections such as wired communication links, wireless communication links, or fiber optic cables. Network 202 can further communicate with one or more servers 204 and 206 and a memory storage unit such as, for example, memory or database 208.

In the depicted example, server 204 and server 206 connect to network 202 along with storage unit 208. In addition, clients 210, 212, and 214 connect to network 202. These clients 210, 212, and 214 may be, for example, personal computers or network computers. Computer system 100 depicted in FIG. 1 can be, for example, a client such as client 210, 212, and/or 214. Alternatively, computer system 100 can be implemented as a server such as servers 204 and/or 206, depending upon design considerations.

In the depicted example, server 204 provides data such as boot files, operating system images, applications, and application updates to clients 210, 212, and 214. Clients 210, 212, and 214 are clients to server 204 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIG. 1 is intended as an example and not as an architectural limitation for different embodiments of the present invention.

The following description is presented with respect to embodiments of the present invention, which can be embodied in the context of a data-processing system such as computer system 100, in conjunction with program 125, and data-processing system 200 and network 202 depicted in FIGS. 1 and 2. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms including Macintosh, UNIX, LINUX, and the like. Therefore, the descriptions of the exemplary embodiments, which follow, are for purposes of illustration and not considered a limitation.

Figure 3:
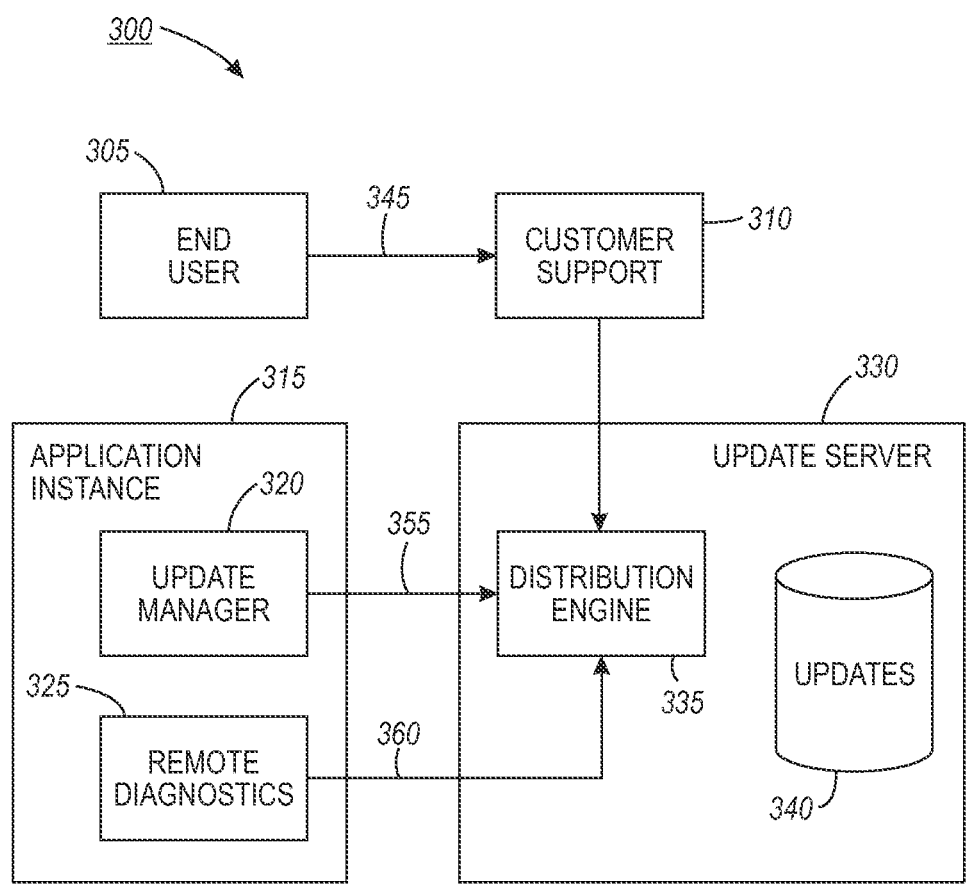
FIG. 3 depicts a block diagram of a software update support system infrastructure, in accordance with the disclosed embodiments.

FIG. 3 illustrates a block diagram of a software update support system infrastructure 300 in accordance with the disclosed embodiments. The Application Instance 315 represents one of the computers where the application is installed. While FIG. 3 only illustrates a single Application Instance 315, it should be appreciated that any number of Application Instances 315 will be present. For example, Application Instance 315 may be associated with a number of clients such as clients 210, 212, and 214 shown in FIG. 2. Each of the Application Instance 315 is identified by a unique identifier such as a serial number, host ID, machine address, or other such unique identifier known in the art that is unique to that set of instances.

The update manager 320 is a module as discussed with respect to FIG. 1. Update Manager 320 may, for example, be software that is installed in the same host as the application. Its purpose is to check for available updates for a particular instance 315 of the application. In addition, Update Manager 320 may assist the user with the installation of the update.

Update server 330 is the central repository where updates 340 are made available for the Application Instance 315. It will be appreciated that update server 330 could be implemented by multiple computers via a functional partitioning or load-balancing scheme.

The remote diagnostics module 325 is a component of the Application Instance 315 that is in charge of monitoring the usage and stability of the application while it runs. The remote diagnostics module 325 provides data to the Distribution Engine 335 indicative of application use and errors detected in a particular instance of the application 315 shown by arrow 360. This data may be provided during or after the installation of a new update.

A customer support center 310 is an organization that is in charge of receiving end user 305 calls and providing support for the application. The customer support personnel receive user error reports as shown by arrow 345. They then evaluate these reports and determine if they are normal end user 305 calls or if the calls indicate an error in the application. In the case when an error is likely, the customer support personnel create a ticket for the solution to the problem. The ticket may also track the amount of time that was needed to provide support for a particular system. The information on the ticket is identified by the unique identifier associated with the Application Instance 315. This data is then provided to the Distribution Engine 335 as shown by arrow.

The Distribution Engine 335 is the element in the system 300 in charge of determining which particular Application Instance 315 should be provided access to a particular update. The Distribution Engine 335 analyzes the data provided from the update manager 320 via arrow 355, remote diagnostics module 325, and customer support 310, and provides a gradual release of the update. The Distribution Engine 335 considers the confidence the update is stable and the support needs associated with the update in determining the release rate of the update.

Figure 4:
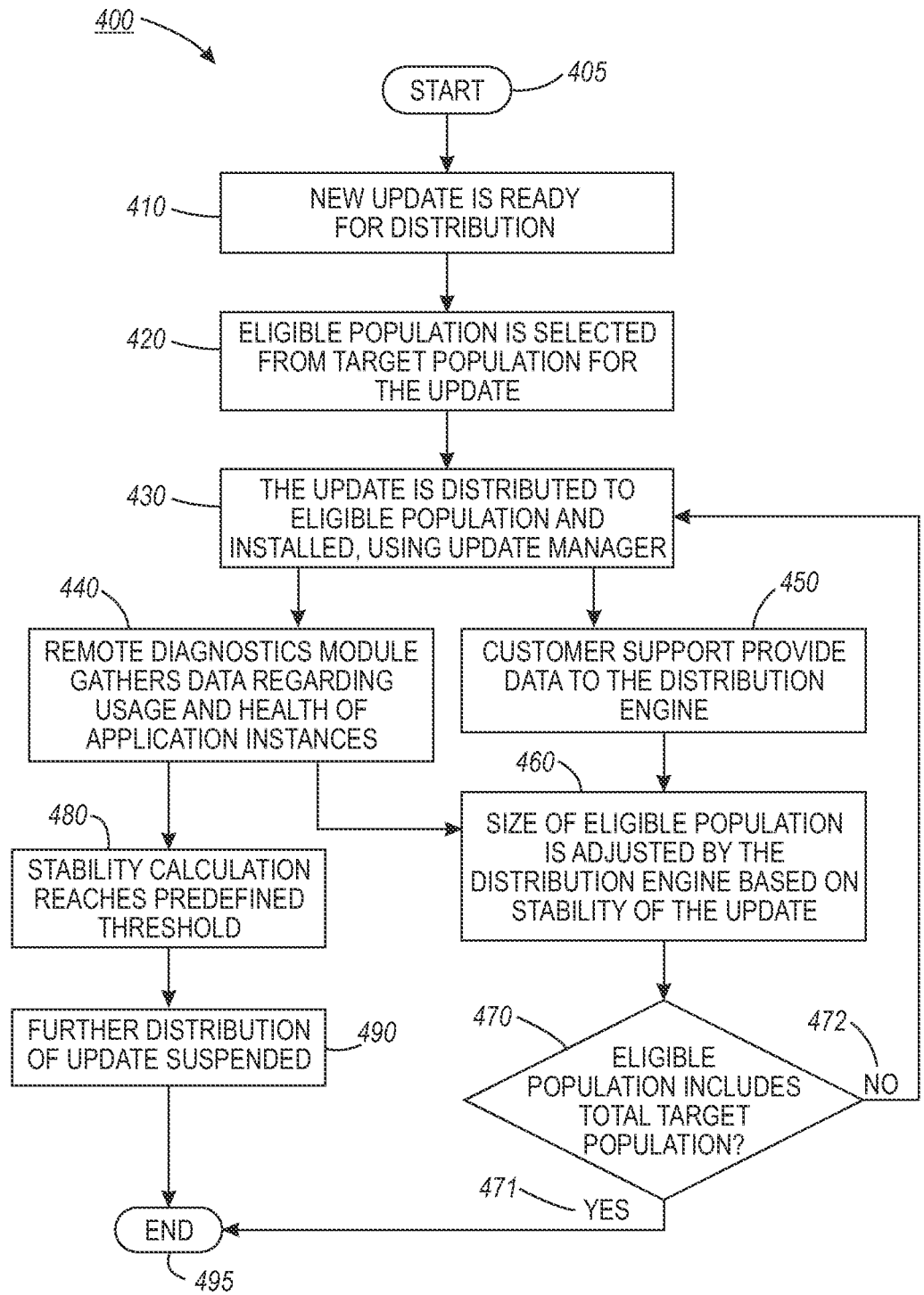
FIG. 4 depicts a flow chart illustrating logical operational steps in distributing software updates in accordance with the disclosed embodiments.

FIG. 4 illustrates a flow chart of logical operational steps of a method 400 for software distribution, in accordance with the disclosed embodiments. As indicated at block 405, the method begins. At block 410 a new update is ready to be distributed. This generally implies the update has been developed and tested. Updates can be published through the Distribution Engine 335. The distribution channel for an update may be over the Internet. Alternatively, the new update may be distributed through alternate channels such as a service engineer visiting one of the installations and performing an update from a removable media.

Next, the target population of the update, which includes the set of Application Instances 315 to which the update applies, can be divided into an eligible population which is then a subset of the target population that is allowed to download and install the update as shown at block 420. The Distribution Engine 335 determines which Application Instance 315 in the target population is included in the initial eligible population for the initial release. The initial size of the eligible population may, for example, be selected as the size of the target population divided by the target time span for the update to be distributed. The update is distributed to the selected eligible population and installed as indicated by block 430. One skilled in the art will appreciate that even if the update is provided to the Application Instance 315, the specific preferences of the particular user of the Application Instance 315 will determine when the update is downloaded and applied. The Update Manger accesses the Application Instance 315 associated with the eligible population and then downloads and installs the update.

The method continues simultaneously as indicated at blocks 440 and 450, which both generally indicate that stability data is collected. As illustrated at block 440, a remote diagnostics module 325 can gather data associated with the stability of the Application Instance 315 where the update has been installed. The remote diagnostics module 325 may also gather data from Application Instance 315 that are manually downloaded and manually installed. This data includes the unique identifier of the Application Instance 315 as well as health and usage data associated with the application such as, for example, a log of encountered errors. The data is periodically pushed to a central location and ultimately to the Distribution Engine 335.

It is also likely that end users 305 of the updated application will encounter errors. This will often result in a phone call to a customer support center 310. The customer support staff is trained to determine if a report indicates a problem in the updated application. When a problem does arise, the customer support technician will create a ticket with information including the unique identifier of the Application Instance 315, the reported error, the solution, and alternatively the time needed to provide support to the particular system. This information is then provided to the Distribution Engine 335 as illustrated by block 450.

At block 460, the Distribution Engine 335 evaluates the stability of the update and adjusts the size of the eligible population accordingly. This evaluation occurs periodically. In a preferred embodiment, the evaluation and size adjustment is preformed once a day. However, one skilled in the art will appreciate that the time scale of this step should be adjusted according to the various attributes of the specific update.

The stability of the update can be based on a number of factors including: the number of Application Instances 315 that have successfully installed the update, the number of Application Instances 315 that encountered a problem while installing the update, the number of Application Instances 315 that have already used the updated application, the number of Application Instances 315 that have encountered problems while using the updated application, the number of Application Instances 315 that have used the application long enough for the instance to be considered stable, the accumulated usage of the application by all instances that have been updated, the accumulated usage of the application by all instances that did not encounter errors, and the accumulated number or errors encountered while using the updated application, or some subset of the aforementioned factors. One skilled in the art will further appreciate that a number of other factors may be useful in gauging the stability of the update and that this list is provided as an example of possible factors.

The aforementioned factors may indicate that the update is stable enough that the eligible population is increased to a larger percentage of the target population. The factors may also suggest the update is unstable in which case the eligible population will be decreased by the Distribution Engine 335.

The size of the eligible population may be adjusted, for example, using formula (1) as follows:

$$Z_d = Z_{d-1} + (T_p/T_s) + (S^4 - E^{20} + U) \quad (1)$$

wherein the term $Z_d$ represents size of the eligible population at day d. Note that in the present example the time scale used is in days, but any appropriate time scale could be used. $Z_{d-1}$ is the eligible population at day d−1. Likewise, $T_p$ represents the target population and $T_s$ is the number of days in the target span. S indicates the number of upgraded applications that are considered stable. This variable can be based on a combination of the aforementioned stability factors or any appropriate stability factors. E represents the number of upgraded Application Instances 315 that have encountered problems, and U represents the number of upgraded Application Instances 315 that have been used at least once. The variable U may alternatively describe any appropriate usage statistic associated with the upgraded Application Instance 315.

In formula (1), the term $(T_p/T_s)$ represents the default number of instances that are added to the eligible population each day. This may be understood as a normal rate for a linear distribution model in which every day a constant number of instances are added to the eligible population until all target instances are part of the eligible population.

The next term $(S^4 - E^{20} + U)$ is an adjustment factor made to the default rate based on the stability of the update in the field. This term could be negative or positive, thus when it is added to the default rate it could increase or decrease the size of the eligible population. The values of the constants in this term can be understood as weighting factors that represent a relative confidence in the model. For example, a more conservative model would give more weight to problems in the field and would rapidly decrease the size of the eligible population when errors are encountered. A less conservative model would give more weight to the number of stable update instances in the field and would therefore increase the size of the eligible population.

Block 470 indicates an iterative loop used to ensure the update is provided to the entire target population. Each time the eligible population size is adjusted, the Distribution Engine 335 checks if the eligible population includes the total target population as shown at block 470. If the eligible population includes the target population indicated by the "yes" block 471, the method ends at block 495. If the target population is still larger than the eligible population, indicated by the no block 472, then the method returns to block 430 and is repeated until the update has been distributed to the entire target population. In many cases, as soon as the update is made available it will be immediately downloaded and installed. However, it may also be the case that the update is not downloaded and installed immediately. Thus, some portions of the eligible population will carryover to become part of the eligible population for the next iterative cycle.

The method 400 also provides a fail safe for particularly unstable updates. Block 480 indicates that if the stability calculation reaches a predefined threshold level, a warning can be provided to the release manager. Further distributions of the update are then suspended as shown at block 490. Other actions may also be taken at this point to correct the unstable update. For example, the update may be reviewed and republished before it is released or may be scrapped and replaced by an equivalent but more stable update. After distributions of the update are suspended, the method ends at block 495, While the present invention has been particularly shown and described with reference to a preferred embodiment, it will be understood by those skilled in the art that various changes in form and detail may be made therein without departing from the spirit and scope of the invention. It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method executed by a processor for software distribution that does not overwhelm support infrastructure, said method comprising:
    selecting an eligible population of application instances to whom a software update is made available, from a target population of application instances;
    gathering a use information from said selected application instance wherein said use information is associated with running software associated with said software update on said selected application instance and gathering an error information from said selected application instance wherein said error information is associated with running said software associated said software update on said selected application instance using a remote diagnostics module configured to monitor the use and stability of said application instance;
    providing said use information and said error information to a distribution engine;
    calculating a stability of said software associated with said software update according to said use information and said error information, wherein said calculation is indicative of a confidence said software update is stable;
    adjusting the size of said eligible population according to said stability calculation associated with said software update; and
    distributing said software update to said adjusted eligible population until said adjusted eligible population includes the total of said target population.

2. The method of claim 1 further comprising distributing said software update to said adjusted eligible population of application instances on a set time interval.

3. The method of claim 2 wherein said stability calculation is based on said use information and error information and calculated by a distribution engine.

4. The method of claim 1 wherein distributing said software update to said eligible population of application instances further comprises:
    providing said software update with an Internet connection; and
    providing said software update on a removable storage media.

5. The method of claim 1 wherein gathering a use information and an error information further comprises:
    collecting use information and error information from an application instance; and
    providing said use information and said error information to a customer support organization comprising an organization in charge of receiving end user calls and providing support for said software.

6. The method of claim 1 wherein adjusting the size of said eligible population of application instances further comprises:
    increasing said eligible population of application instances as said stability calculation indicates said software is stable after said software update is installed; and decreasing said eligible population of application instances as said stability calculation indicates said software is unstable after said software update is installed.

7. The method of claim 3 wherein said stability calculation is determined according to at least two of the following stability indicators:
the number of said application instances that have successfully installed said software update;
the number of said application instances that have not successfully installed said software update;
the number of said application instances that have used said software update;
the number of said application instances that have encountered an error when using said software update; and
the number of said application instances that have used said software update for a stable time interval.

8. The method of claim 2 wherein said set time interval is one day.

9. The method of claim 1 further comprising warning a release manager module as said stability calculation reaches a predefined warning threshold; and
suspending further distribution of said software update.

10. A method executed by a processor for software distribution that does not overwhelm support infrastructure, said method comprising:
selecting an eligible population of application instances to whom a software update is made available, from a target population of application instances;
gathering a use information from said selected application instance wherein said use information is associated with running software associated with said software update on said selected application instance and gathering an error information from said application instances wherein said error information is associated with running software associated with said software update on said selected application instance using a remote diagnostics module configured to monitor the use and stability of said application instance and collecting use information and error information from an application instance provided to a customer support organization comprising an organization in charge of receiving end user calls and providing support for said software;
providing said use information and said error information to a distribution engine;
calculating a stability of said software associated with said software update according to said use information and said error information, wherein said calculation is indicative of a confidence said software update is stable; and
adjusting the size of said eligible population and distributing said software update to said adjusted eligible population, on a set time interval, according to a stability calculation provided by a distribution engine wherein said stability calculation is based on said use information and error information, until said adjusted eligible population includes the total of said target population.

11. The method of claim 10 further comprising:
distributing said software update to said eligible population of application instances, wherein said software update is distributed using an Internet connection or said software update is distributed on a removable storage media.

12. The method of claim 10 wherein adjusting the size of said eligible population of application instances further comprises:

increasing said eligible population of application instances if said stability calculation indicates said software is stable after said software update is installed; and
decreasing said eligible population of application instances if said stability calculation indicates said software is unstable after said software update is installed.

13. The method of claim 10 wherein said stability calculation is determined according to at least two of the following stability indicators:
the number of said application instances that have successfully installed said software update;
the number of said application instances that have not successfully installed said software update;
the number of said application instances that have used said software update;
the number of said application instances that have encountered an error when using said software update; and
the number of said application instances that have used said software update for a stable time interval.

14. The method of claim 10 wherein said set time interval is one day.

15. The method of claim 10 further comprising warning a release manager module as said stability calculation reaches a predefined warning threshold; and
suspending further distribution of said software update.

16. A system for distributing a software update that does not overwhelm support infrastructure, said system comprising:
a hardware processor;
a computer-usable medium embodying computer code, said computer-usable medium being coupled to said processor, said computer program code comprising instruction modules executable by said processor;
an update manager module associated with a computer application instance that checks an update server for aft a software update for said computer application instance wherein said update is provided to said computer application instance if said computer application instance is selected as an eligible computer application instance;
a remote diagnostics module associated with said computer application instance for gathering use information from said selected application instance wherein said use information is associated with running said software associated with said software update on said selected application instance and gathering stability data associated with running said software associated with said software update from said computer application instance and providing said data to a distribution engine module; and
a customer support organization module for gathering use and stability data from said computer application instance and providing said data to said distribution engine module wherein said distribution engine module adjusts the size of said eligible computer application instance according to a stability calculation indicative of a confidence said software is stable, and distributes said software update to said eligible population of application instances until said eligible population includes a total target population.

17. The system of claim 16 wherein said remote diagnostics module adjusts the size of said eligible population of application instances and distributes said software update to said adjusted eligible population of application instances on a set time interval.

18. The system of claim 17 further including an internet connection for distributing said software update to said eligible population of application instances; and a removable storage media for distributing said software update to said eligible population of application instances.

19. The system of claim 16 wherein said distribution engine module adjusts the size of said eligible population of application instances by:
   increasing said eligible population of application instances if said stability calculation indicates said software is unstable after said software update is installed; and
   decreasing said eligible population of application instances if said stability calculation indicates said software is unstable after said software update is installed.

20. The system of claim 16 wherein said distribution engine module performs said stability calculation according to at least two of the following stability indicators:
   the number of said computer application instances that have successfully installed said software update;
   the number of said computer application instances that have not successfully installed said software update;
   the number of said computer application instances that have used said software update;
   the number of said computer application instances that have encountered an error when using said software update; and
   the number of said computer application instances that have used said software update for a stable time interval.

* * * * *